Jan. 11, 1927.  1,613,924

H. BOLTSHAUSER

STUFFING BOX FOR SHAFTS

Filed Oct. 19, 1925

Inventor,
Heinrich Boltshauser
By
atty.

Patented Jan. 11, 1927.

1,613,924

UNITED STATES PATENT OFFICE.

HEINRICH BOLTSHAUSER, OF ZURICH, SWITZERLAND.

STUFFING BOX FOR SHAFTS.

Application filed October 19, 1925. Serial No. 63,400, and in Switzerland October 25, 1924.

The present invention relates to a stuffing box for shafts, rods and similar machinery parts particularly for shafts of steam turbines, having packing segments movable in stationary radial guides and acted upon by springs tending to move the segments in the radial inward direction. The object of the present invention consists in providing a stuffing box of this type with which a strictly determined clearance between the packing segments and the machinery part to be packed may be adjusted and which permits the packing segments to yield in a radial direction when the machinery part runs untrue so that practically neither wear of the machinery part nor of the segments occurs, so that a good packing effect is continuously ensured. To this end an adjustable member is provided in connection with every segment. Normally the segment bears with an abutment face on said member by the influence of its spring, whilst a second abutment face of the same segment is distanced from the adjustable member by a determined radial clearance so that when the machinery part to be packed runs untrue the segment may yield in the outward direction against the action of the spring up to the total amount of the radial clearance.

A constructional example of the subject matter of the present invention is illustrated on the accompanying drawings, in which.

Figure 1:
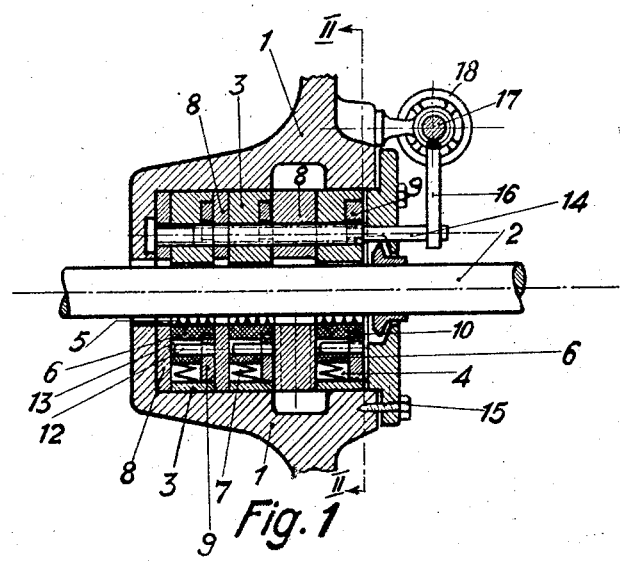
Fig. 1 is a longitudinal section along line I—I in Fig. 2 through a stuffing box for a turbine shaft.
Figure 2:
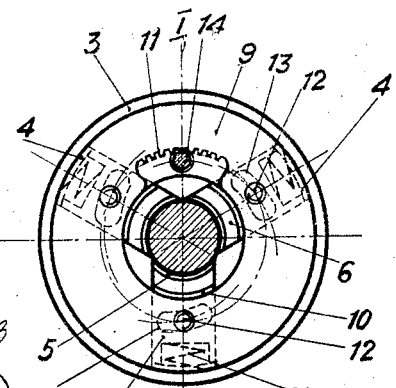
Fig. 2 shows on a slightly larger scale an end view of the stuffing box with the cover of the latter removed and seen from the right hand side of Fig. 1.
Figure 3:
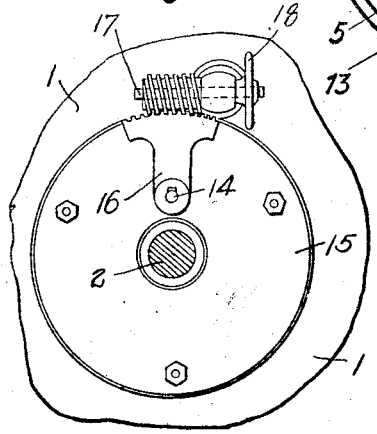
Fig. 3 shows an end view of Fig. 1.

The illustrated stuffing box for a turbine shaft comprises rings 3 mounted in the wall of the turbine casing 1 and surrounding the shaft 2 with clearance. Each ring 3 is provided with a group of recesses 4 radiating from the shaft 2 and the packing segments 6 are movable in a radial direction in said recesses. The segments 6 are provided with recesses. The segments 6 are provided with ribs 5 extending in the direction of rotation of the shaft 2 and forming a labyrinth packing and further a spring 7 is provided for every segment 6 tending to move the latter along the recess 4 in the radial inward direction. 8 denotes distance pieces inserted between the individual rings 3. In connection with each group of packing segments 6 arranged in spider fashion around the shaft 2 a plate 9 is provided which is housed in a recess 10 of the respective ring 3. At the inner circumference of each plate 9 a short length of a toothed rim 11 is provided in the manner seen in Fig. 2 and in each plate 9 members formed as cylindrical pins 12 are rigidly fixed. The latter project into slots 13 provided in the segments 6 and eccentrically arranged to the axis of the shaft 2; the pins 12 prevent any further inward movement of the segments as soon as the outer arc of the slots 13 which acts as an abutment face bears against the respective pin 12. The diameter of the pin 12 is smaller than the width of the slots 13. The toothed rim parts 11 of all of the plates 9 cooperate with that portion of a spindle 14 which is shaped as a pinion; the spindle projects beyond the cover 15 of the stuffing box and carries at its end a sector 16. The outer circumference of the latter forms, for example, a worm wheel cooperating with a worm 17. The worm 17 may be manually turned by means of a hand wheel 18.

When assembling the stuffing box first of all care has to be taken that all the packing segments 6 are in contact with the shaft 2. This requires a corresponding adjustment of the pins 12 which is easily performed by means of the worm 17 and the parts 16, 13 and 9. When the pins 12 are so adjusted that the segments 6 influenced by the springs 4 are just in contact with the shaft 2 the outer arc of the slots 13 acting as abutment face rests at one place on the pin 12. In order to provide a determined clearance between the shaft 2 and the packing elements 6 the worm 17 has to be turned in the opposite direction in which it has been turned previously whereby the segments 6 are displaced by a determined amount in the radial outward direction. By means of marks obtained by calibration on the device serving to turn the worm 17 it is possible to ascertain exactly the amount of the provided clearance and to exactly adapt the latter to all the working conditions, to which end neither a special extension of the stuffing box is necessary nor has the outer shape of the segments to be altered in any way. As soon as a clearance is present between the pins 12 and the inner arc of the slots 13 which forms a second abutment face the segments 6 may yield by the amount of that clearance in the outward direction when the shaft 2 runs untrue, whereby neither the shaft nor the segments are worn and a good packing effect is therefore permanently ensured.

I claim:

1. A stuffing box for shafts, rods and similar machinery parts, particularly for shafts of steam turbines, comprising in combination, a plurality of radial guide chambers, a packing element in each chamber and capable of radial movement, resilient means in operative engagement with each packing element tending to move the element in the radial inward direction, and an adjustable member provided for each packing element, each of said packing elements having two abutment faces with which said adjustable member is adapted to cooperate, one of said abutment faces determining the innermost position of the packing element and the other abutment face being distanced from its adjustable member by a radial clearance to permit the element to yield when the machinery part to be packed runs untrue.

2. A stuffing box for shafts, rods and similar machinery parts, particularly for shafts of steam turbines, comprising in combination, at least one packing ring having a plurality of radial guide chambers, a packing element in each chamber and capable of radial movement, resilient means in operative engagement with each packing element and tending to move the element in the radial inward direction, an adjustable member provided for each packing element and adapted to cooperate with two abutment faces provided on each packing element, said abutment faces being at a larger radial distance from each other than the radial extent of said adjustable member and one of said abutment faces determining the innermost position of the packing element whilst the other abutment face limits the yield of the packing element in the radial outward direction when the machinery part to be packed runs untrue, and means adapted to adjust said adjustable members in a radial direction for the purpose of adjusting the radial clearance between the packing elements and the machinery part to be packed.

3. A stuffing box for shafts, rods and similar machinery parts, particularly for shafts of steam turbines, comprising in combination, at least one packing ring having a plurality of radial guide chambers, a set of packing segments in connection with each packing ring and capable of radial movement in said guide chambers, springs cooperating with said packing segments and tending to move the latter in the radial inward direction, a turnable plate for each set of packing segments, a pin for each packing segment on said plate, two abutment faces on every packing segment formed by two opposite walls of slots eccentrically arranged to the axis of the machinery part to be packed, said pins projecting into said slots and the radial distance between said abutment faces being larger than the diameter of said pins, the outer abutment face determining the innermost position of the packing segment and the inner abutment face limiting the yield of the packing segment in the radial outward direction when the machinery part to be packed runs untrue, and means adapted to angularly adjust said plate and to adjust thereby the radial clearance between the packing segments and the machinery part to be packed.

4. A stuffing box for shafts, rods and similar machinery parts, particularly for shafts of steam turbines, comprising in combination, at least one packing ring having a plurality of radial guide chambers, a set of packing segments in connection with each packing ring and capable of radial movement in said guide chambers, springs cooperating with said packing segments and tending to move the latter in the radial inward direction, a turnable plate for each set of packing segments, a pin for each packing segment on said plate, two abutment faces on every packing segment formed by two opposite walls of slots eccentrically arranged to the axis of the machinery part to be packed, said pins projecting into said slots and the radial distance between said abutment faces being larger than the diameter of said pins, the outer abutment face determining the innermost position of the packing segment and the inner abutment face limiting the yield of the packing segment in the radial outward direction when the machinery part to be packed runs untrue, and means common to all the sets of packing segments and adapted to angularly adjust said plates of all the sets and to adjust thereby the radial clearance between the packing segments and the machinery part to be packed.

5. A stuffing box for shafts, rods and similar machinery parts, particularly for shafts of steam turbines, comprising in combination at least one packing cage having a plurality of recesses radially arranged in the same plane, a packing element in each recess capable of radial movement therein and each comprising two abutment faces arranged at a determined distance from each other, resilient means for each element to urge it radially inward, and a manually adjusting member normally engaging one abutment face of the packing element, the second abutment face of the element being distanced from said member by a determined clearance, whereby each element may yield against the action of the said resilient means to the total extent of said clearance when the machine part to be packed runs untrue.

6. In a stuffing box, a packing cage having a plurality of radial recesses, a packing element radially movable in each recess and means to urge said elements radially inward, and manually operated means to radially adjust the elements while permitting independent radial outward movement.

7. In a stuffing box, a packing cage having a plurality of radial recesses, a packing element radially movable in each recess, a spring for each element to urge it radially inward, a cam surface on each element, means engaging each surface, and manually operated devices to move said means to simultaneously limit the inward position of said elements while permitting their independent outward radial movements.

In testimony whereof, I have signed my name to this specification.

HEINRICH BOLTSHAUSER.